(12) United States Patent
Xiao (10) Patent No.: US 12,446,545 B2
(45) Date of Patent: Oct. 21, 2025

(54) PET WATER DISPENSER

(71) Applicant: Weijun Xiao, Shenzhen (CN)

(72) Inventor: Weijun Xiao, Shenzhen (CN)

(73) Assignee: Leshuo Rongcheng (Shenzhen) Industry Co., Ltd., Shenzhen (CN)

( * ) Notice: Subject to any disclaimer, the term of this patent is extended or adjusted under 35 U.S.C. 154(b) by 0 days.

(21) Appl. No.: 19/023,404

(22) Filed: Jan. 16, 2025

(65) Prior Publication Data

US 2025/0151696 A1    May 15, 2025

(30) Foreign Application Priority Data

Oct. 25, 2024   (CN) .......................... 202411498959.2

(51) Int. Cl.
*A01K 7/02*   (2006.01)
*A01K 39/02*   (2006.01)

(52) U.S. Cl.
CPC .............. *A01K 7/025* (2013.01); *A01K 39/02* (2013.01)

(58) Field of Classification Search
USPC ............................................. 119/72, 74, 51.5
See application file for complete search history.

(56) References Cited

U.S. PATENT DOCUMENTS

| | | | | |
|---|---|---|---|---|
| 1,446,701 A | * | 2/1923 | Harris | A01K 39/022 119/81 |
| 1,820,835 A | * | 8/1931 | Sauvageau | A01K 39/026 119/77 |
| 1,977,571 A | * | 10/1934 | Brumm | F24C 5/18 137/376 |
| 2,097,719 A | * | 11/1937 | Brembeck | A01K 39/024 119/80 |
| 6,079,361 A | * | 6/2000 | Bowell | A01K 7/02 119/72 |
| 7,146,930 B1 | * | 12/2006 | Ness | A01K 7/02 141/366 |
| 11,291,183 B1 | * | 4/2022 | Mayer | C02F 1/4618 |
| 11,766,025 B2 | * | 9/2023 | Peng | A01K 7/025 119/72 |
| 2004/0118356 A1 | * | 6/2004 | Krishnamurthy | A01K 7/025 119/74 |
| 2010/0050950 A1 | * | 3/2010 | Graves | A01K 7/02 119/81 |
| 2013/0125824 A1 | * | 5/2013 | Farris | B05B 1/00 119/72.5 |
| 2019/0313604 A1 | * | 10/2019 | Stone | A01K 7/02 |
| 2022/0132810 A1 | * | 5/2022 | Levite | F16B 2/22 119/74 |
| 2023/0128170 A1 | * | 4/2023 | Avci | H04B 1/1615 455/552.1 |
| 2024/0206429 A1 | * | 6/2024 | Miller | A01K 7/06 |

* cited by examiner

*Primary Examiner* — Andrea M Valenti (57) ABSTRACT

A pet water dispenser includes a water replenishment assembly and a base assembly. The water replenishment assembly includes a water tank main body, a water tank pedestal, a water filling tank lid and a water outlet tank lid. The water tank main body is equipped with a water outlet port. The water tank pedestal is configured to support the water tank main body, so that the water tank main body can stand stably on any plane on a premise of the water outlet port facing downward. The base assembly includes a base main body, and the base main body is equipped with a pedestal mounting portion. The pedestal mounting portion is configured to fix the water replenishment assembly on the base assembly.

2 Claims, 8 Drawing Sheets

PET WATER DISPENSER

CROSS-REFERENCE TO RELATED APPLICATIONS

This application claims a priority of Chinese patent application No. CN 2024114989592 filed on Oct. 25, 2024, and entitled "PET WATER DISPENSER".

TECHNICAL FIELD

The present invention relates the technical field of pet supplies, and in particular, to a pet water dispenser.

BACKGROUND OF THE INVENTION

With the development of society, while people are enjoying the material life, they are constantly pursuing the spiritual life. An increasing number of people like to raise various pets. Although pets are lovely, when they drink water, their owners usually use containers such as basins or bowls to hold water for them. However, pets' paws often overturn these water-holding containers, causing the pets to drink water from the ground. This is unhygienic and likely to make the pets ill. As a result, the pets need to be taken to the pet hospital for treatment, which consumes both human effort and financial resources. Pet owners hope to purify the water to meet the hygiene standards and reduce the incidence of diseases among pets.

At present, there are also intelligent water dispensers on the market. However, due to their relatively high prices, they are hardly acceptable to ordinary pet lovers. In response to these problems, corporate technicians have made several improvements and designed a pet water dispenser with a pure mechanical structure. Nevertheless, for the current pet water dispensers with a pure mechanical structure relying on gravity, when water replenishment is needed, there are still problems such as the need to invert the main body of the water bucket first and then add water to the pet water dispenser, and the inability to place the main body of the water bucket in an inverted state on a flat surface.

Therefore, the present invention provides a pet water dispenser, which can effectively solve the above problems.

SUMMARY OF THE INVENTION

In order to overcome the deficiencies of the prior art, the present invention provides a pet water dispenser. The pet water dispenser has a simple structure and does not require inverting the water tank main body before adding water to the pet water dispenser, thus further enhancing the user experience.

The technical solution adopted by the present invention to solve the technical problem is as follows.

A pet water dispenser includes a water replenishment assembly and a base assembly. The water replenishment assembly includes a water tank main body, a water tank pedestal, a water filling tank lid, and a water outlet tank lid. The water tank main body is equipped with a water outlet port and a water filling port, the water filling tank lid is configured to open or close the water filling port, and the water outlet tank lid is configured to open or close the water outlet port. The water tank pedestal is configured to support the water tank main body, so that the water tank main body can stand stably on any plane on a premise of the water outlet port facing downward. The base assembly includes a base main body, and the base main body is equipped with a pedestal mounting portion; the pedestal mounting portion is configured to fix the water replenishment assembly on the base assembly.

As an improvement of the present invention, the water outlet tank lid is provided with a water sealing plug and a movable pin, and the movable pin is configured to drive the water sealing plug to seal or unblock the water outlet port; the water filling tank lid is provided with a gripping handle.

As an improvement of the present invention, the water tank pedestal includes a water tank mounting portion, and the water tank mounting portion is provided with a snap-fit hole; the water tank main body further includes a snap-fit mounting portion, and the snap-fit mounting portion is provided with a snap-fit projection; the water tank main body and the water tank pedestal are fixedly connected through the water tank mounting portion and the snap-fit mounting portion, and the water tank mounting portion and the snap-fit mounting portion are connected by snap-fit through the snap-fit hole and the snap-fit projection.

As an improvement of the present invention, the water tank pedestal includes a water tank support portion, and the water tank support portion is provided with a plurality of support legs; the pedestal mounting portion is provided with a pedestal mounting hole, and the shape and number of the pedestal mounting holes match the shape and number of the support legs; the base assembly and the water replenishment assembly are fixedly connected through the pedestal mounting portion and the water tank pedestal, and the pedestal mounting portion and the water tank pedestal are detachably connected through the support legs and the pedestal mounting holes.

As an improvement of the present invention, the water outlet tank lid is provided with a first threaded portion; the water filling tank lid is provided with a second threaded portion; the water outlet port is provided with a third threaded portion; the water filling port is provided with a fourth threaded portion; the water outlet tank lid and the water outlet port are threadedly connected through the first threaded portion and the third threaded portion, and the water filling tank lid and the water filling port are threadedly connected through the second threaded portion and the fourth threaded portion.

As an improvement of the present invention, the base assembly further includes a water container; the base main body includes an accommodating groove; the shape of the accommodating groove matches the external shape of the water container, and the accommodating groove is configured to accommodate the water container.

As an improvement of the present invention, the base assembly further includes an anti-slip strip; the base main body further includes a mounting groove; the shape of the mounting groove matches the external shape of the anti-slip strip, and the mounting groove is configured to mount the anti-slip strip.

As an improvement of the present invention, the water outlet tank lid is further provided with a spring, a mounting through hole, and a tank-lid abutting portion; the movable pin includes an abutting projection, a connecting projection and a connecting post, and the abutting projection and the connecting projection are fixedly connected through the connecting post; the size of the mounting through hole matches the external size of the connecting post; the movable pin is movably mounted on the water outlet tank lid through the connecting post and the mounting through hole; the spring is sleeved on the connecting post, and both ends of the spring abut against the abutting projection and the tank-lid abutting portion respectively; when the pet water dispenser is in use, the abutting projection keeps abutting against the water container.

As an improvement of the present invention, the water sealing plug is provided with a connecting through hole; the connecting through hole is arranged at a central position of the water sealing plug; the movable pin and the water sealing plug are connected by snap-fit through the connecting through hole and the connecting projection.

As an improvement of the present invention, the pet water dispenser further includes a filtering assembly, and the filtering assembly is configured to filter water flowing out of the water tank main body; the filtering assembly includes a filtering filter element, a filtering housing, and a filtering cover; the filtering housing is provided with an accommodating chamber and an opening connected to the accommodating chamber; the filtering cover is fitted over the opening of the accommodating chamber, and the filtering filter element is arranged within the accommodating chamber.

Beneficial effects of the present invention are as follows. By the arrangement of the above structure, during use, since the water filling port is provided, it is not necessary to invert the water tank main body before adding water to the pet water dispenser. Instead, water can be directly added to the pet water dispenser through the water filling port. Due to the presence of the water tank pedestal, which provides support for the water tank main body, the water tank main body can be placed on any flat surface with the water outlet port facing downward. This enables users not only to directly add water to the pet water dispenser through the water filling port but also to conveniently place the water tank main body and the water tank pedestal on any flat surface that is convenient for adding water and then add water to the water replenishment assembly through the water filling port, further enhancing the user experience. Since the water filling tank lid is provided, the water filling port can be freely opened or closed as required. When there is no need to add water, the water filling tank lid closes the water filling port, which can effectively prevent dust from falling into the drinking water contained in the water tank main body, further enhancing the user experience.

BRIEF DESCRIPTION OF DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work. In addition, the accompanying drawings are not drawn to a scale of 1:1, and the relative dimensions of the various elements are only shown as examples in the diagrams, not necessarily drawn to a true scale.

The present invention is further described below in detail in combination with the accompanying drawings and embodiments.

DETAILED DESCRIPTION OF THE INVENTION

To make the aforementioned objectives, features, and advantages of the present invention more comprehensible, specific implementations of the present invention are described in detail below in conjunction with the accompanying drawings. In the following description, numerous specific details are set forth to provide a thorough understanding of the present invention. The present invention may, however, be embodied in many forms different from that described here. A person skilled in the art can make similar improvements without departing from the connotation of the present invention. Therefore, the present invention is not limited by the specific embodiments disclosed below.

In the description of the present invention, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present invention and simplifying the description, Rather than indicating or implying that the indicated device or element must have a particular orientation, be constructed and operated in a particular orientation, therefore, not to be construed as limiting the present invention.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present invention, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present invention can be understood based on specific circumstances.

In the present invention, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Figure 1:
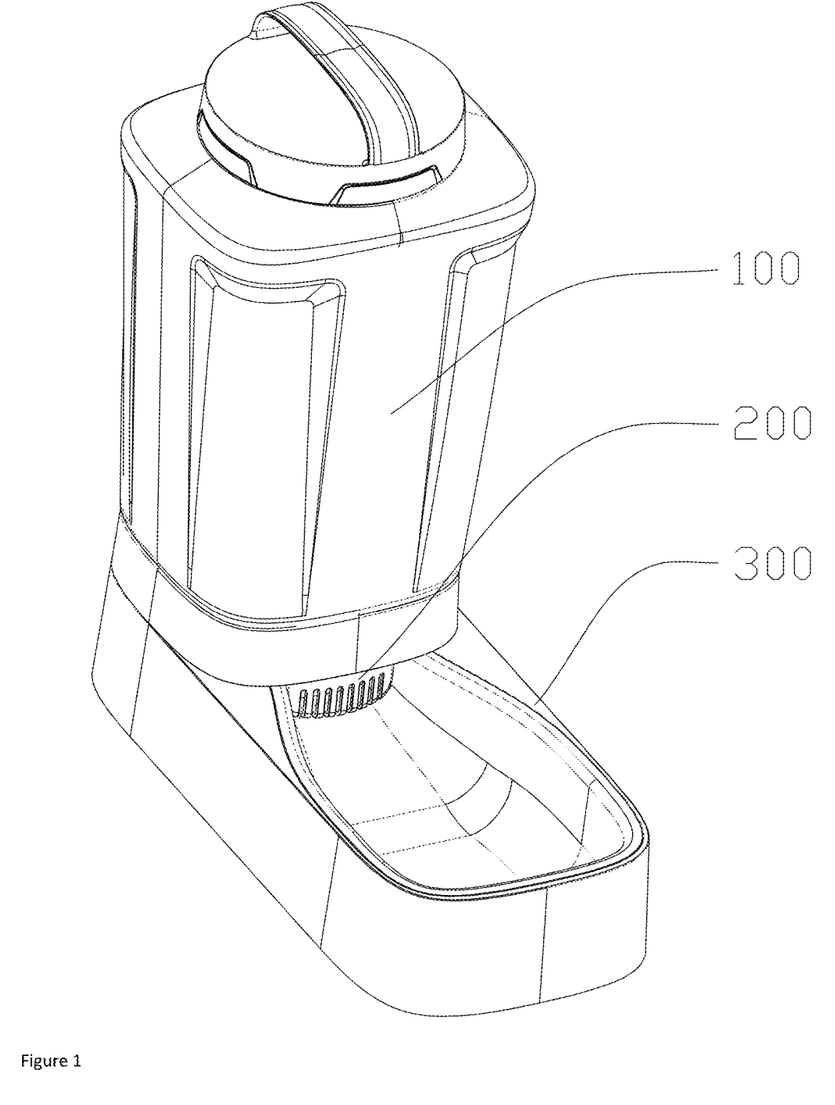
FIG. 1 is a schematic diagram of an entire structure of a pet water dispenser according to the present invention.
Figure 2:
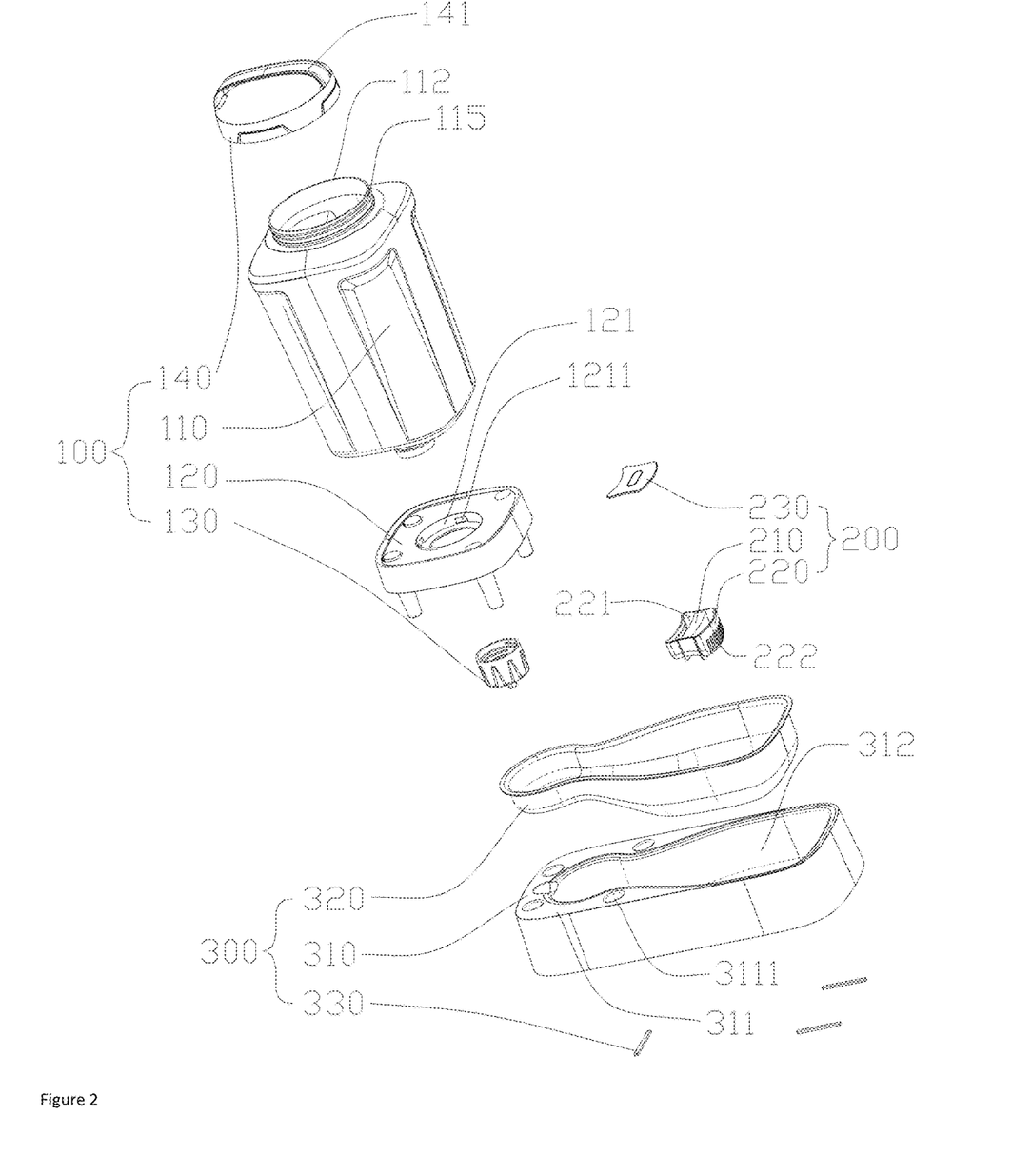
FIG. 2 is an exploded diagram from a first angle of the pet water dispenser according to the present invention.
Figure 3:
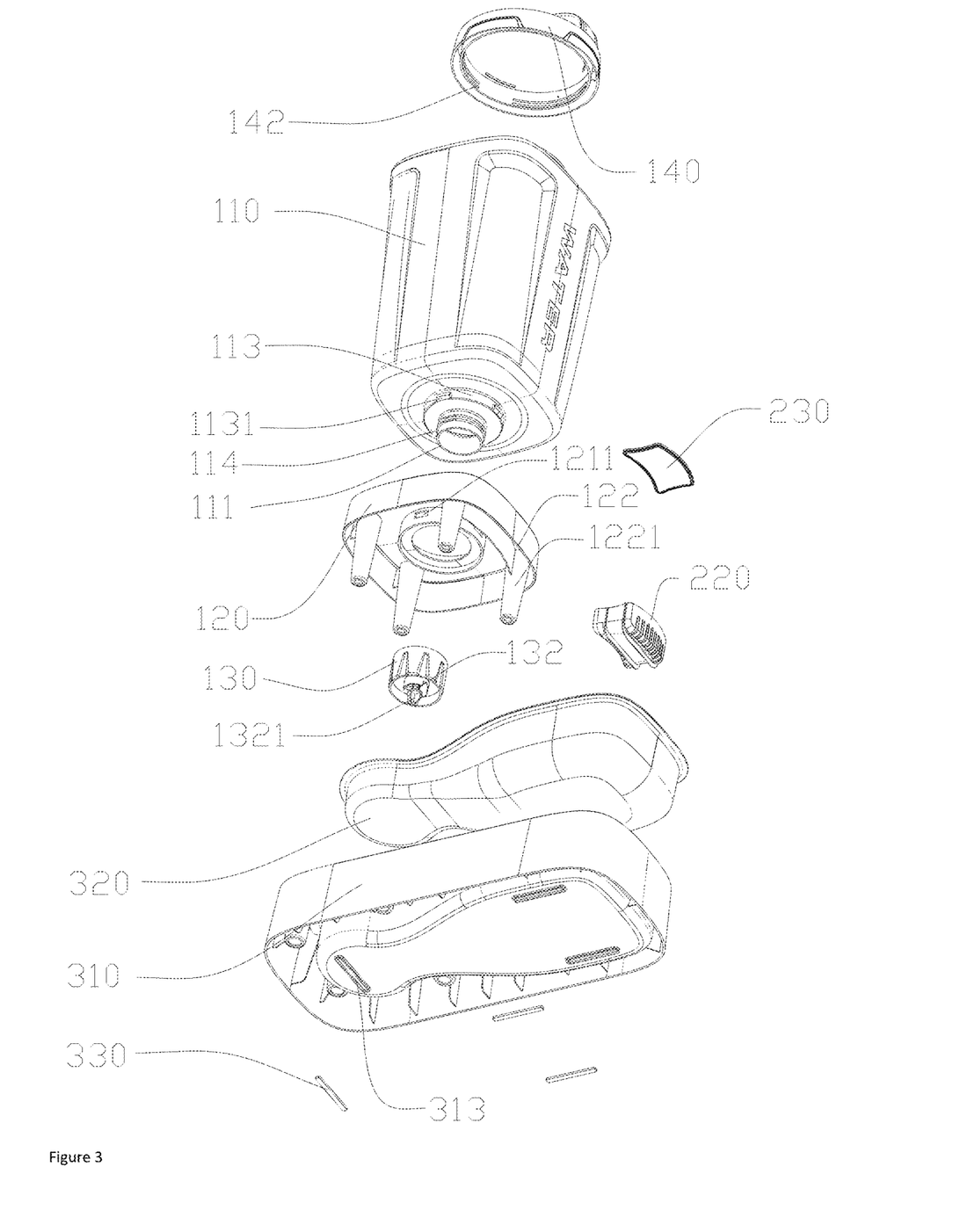
FIG. 3 is an exploded view from a second angle of the pet water dispenser according to the present invention.
Figure 4:
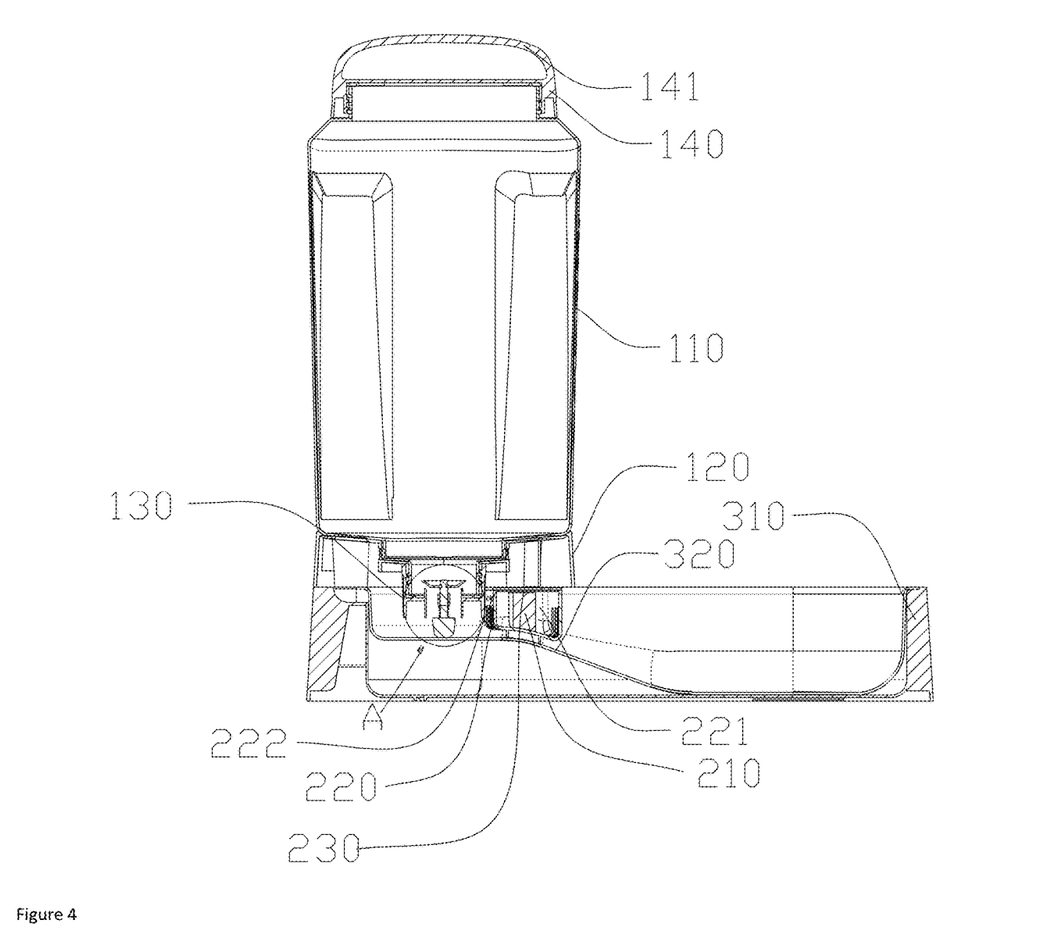
FIG. 4 is a schematic diagram of a cross-sectional structure of the pet water dispenser according to the present invention.
Figure 5:
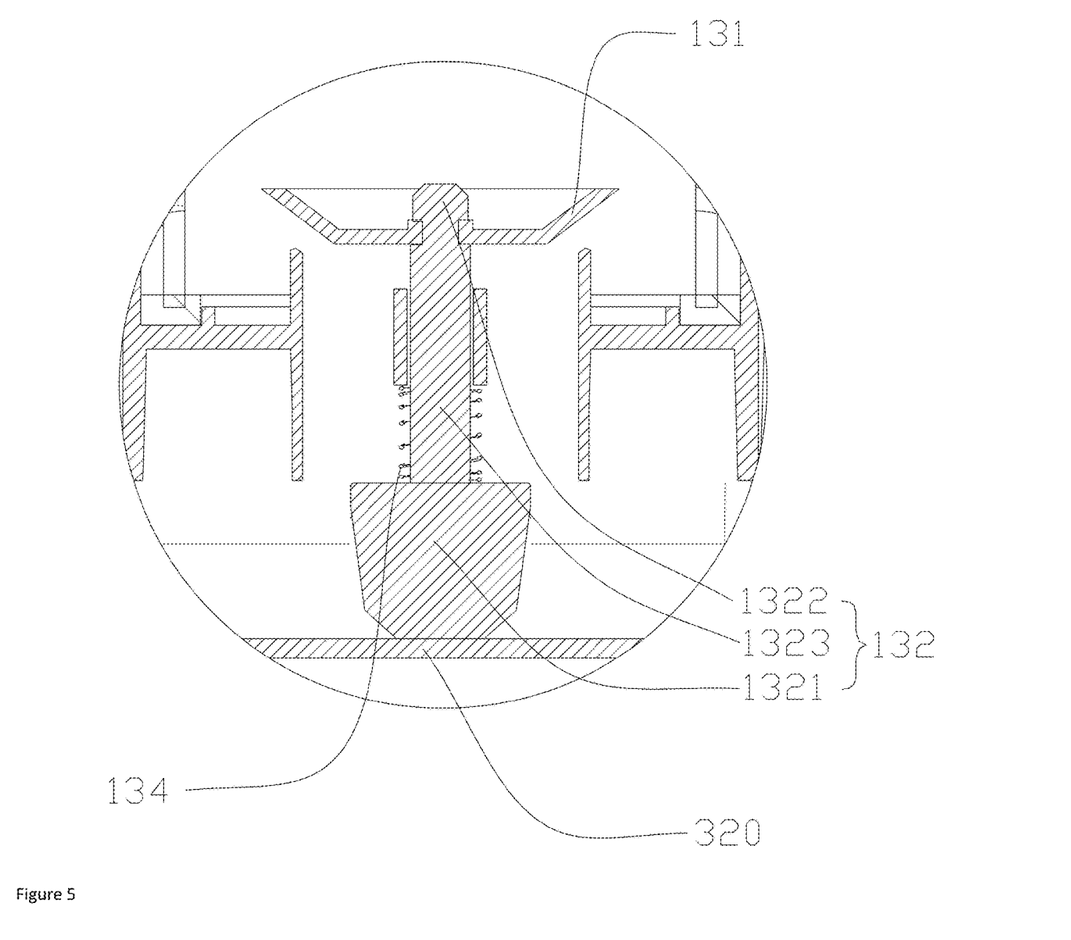
FIG. 5 is an enlarged view of circle A of FIG. 4.
Figure 6:
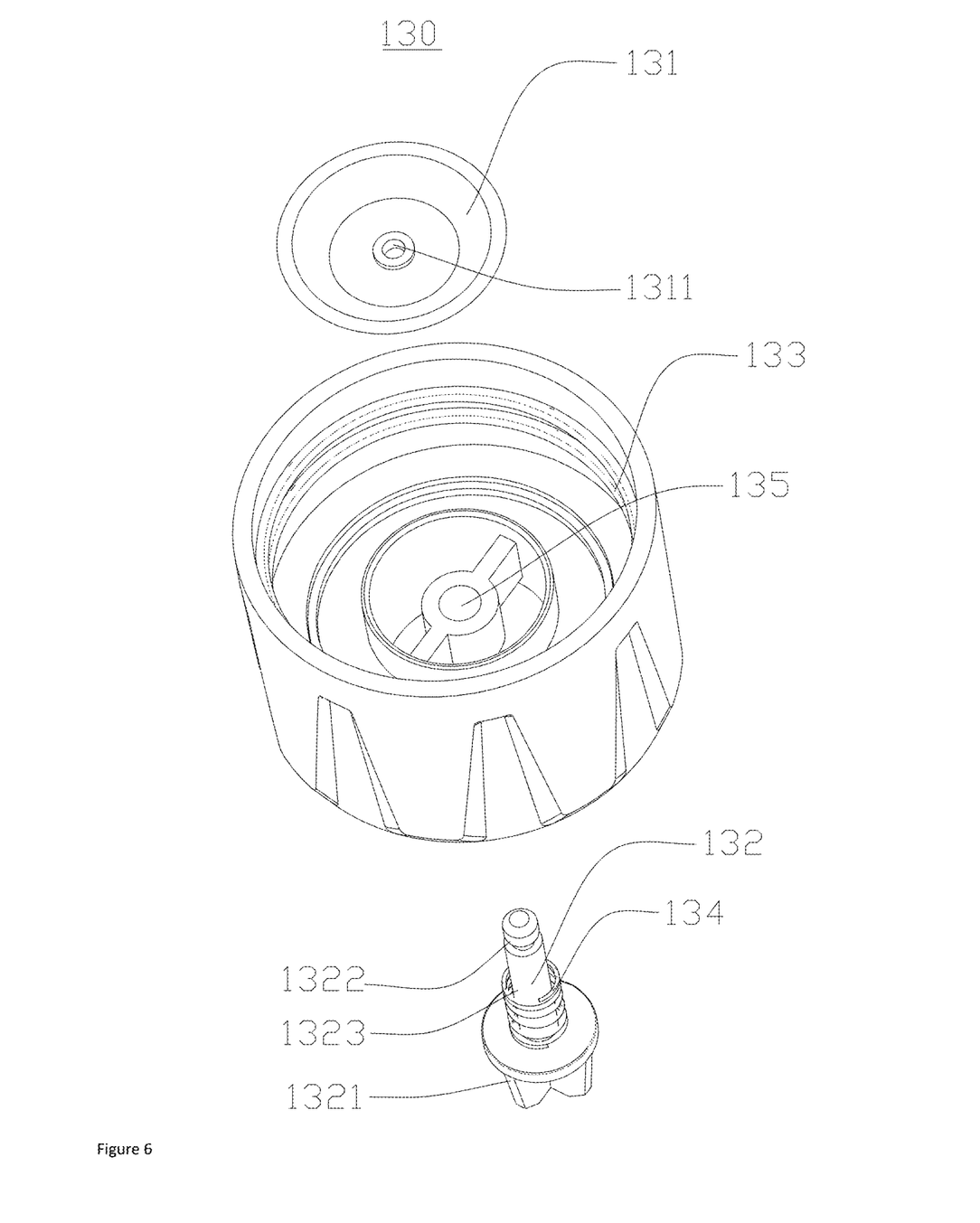
FIG. 6 is an exploded view from the first angle of a water outlet tank lid of the pet water dispenser according to the present invention.
Figure 7:
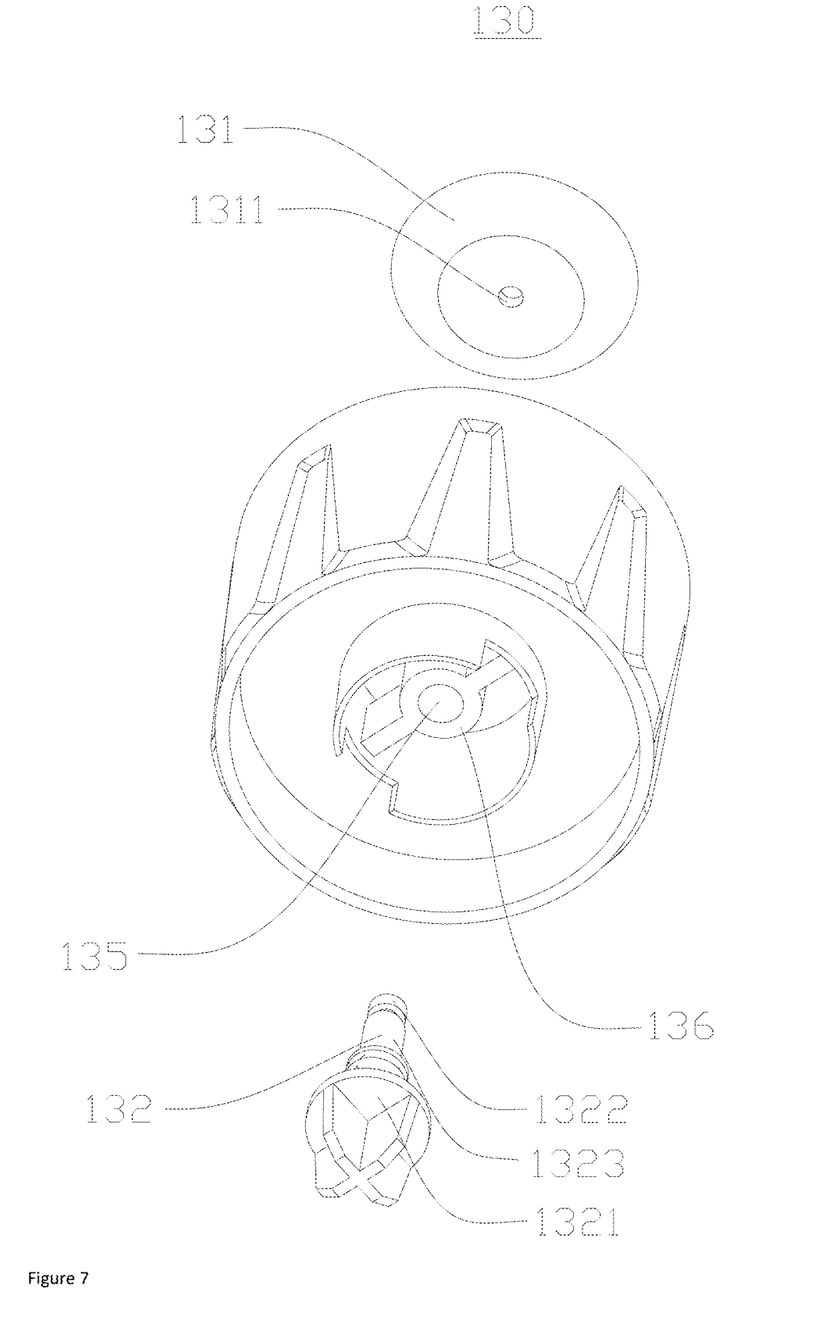
FIG. 7 is an exploded view from the second angle of the water outlet tank lid of the pet water dispenser according to the present invention.
Figure 8:
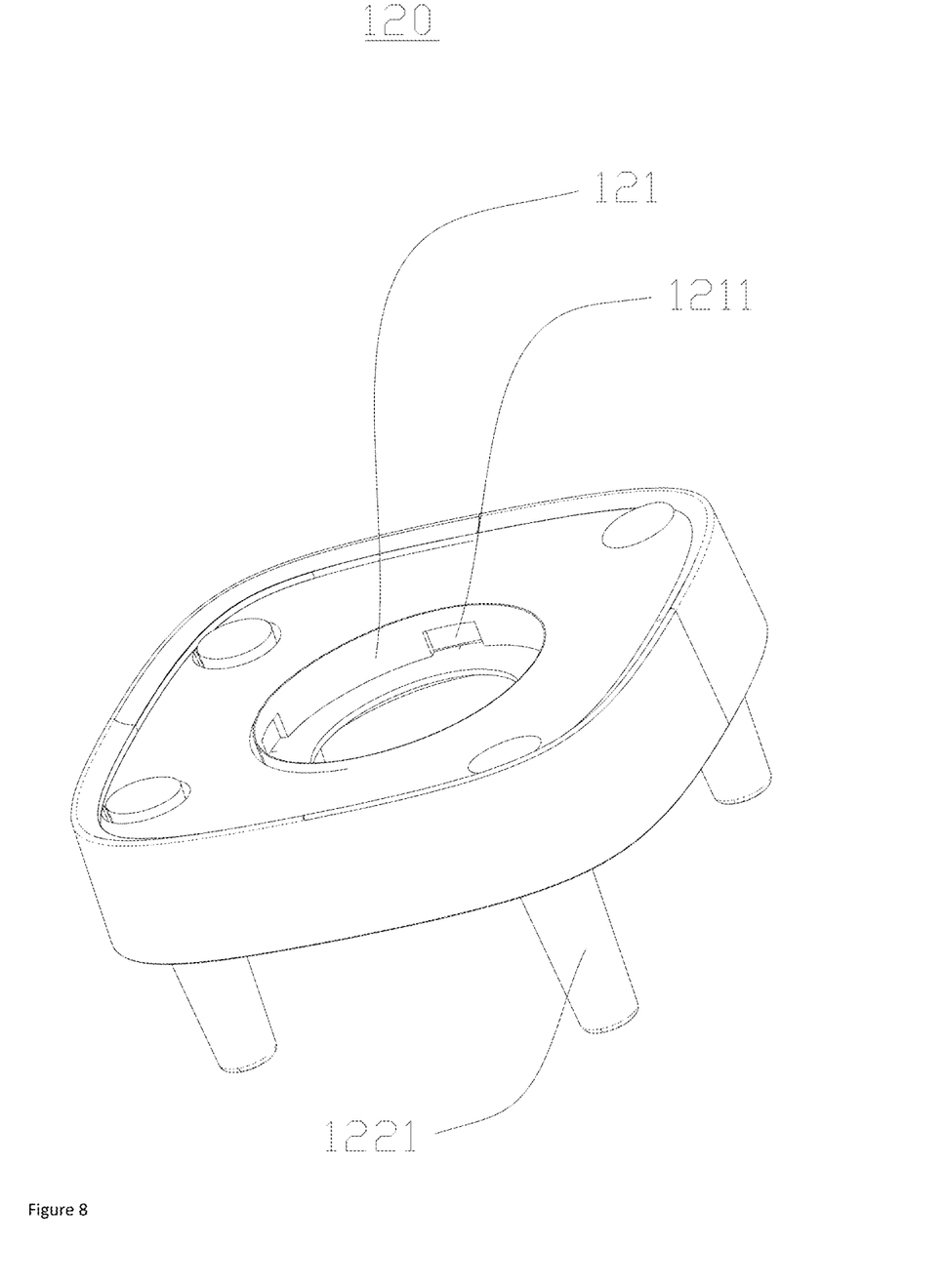
FIG. 8 is an enlarged view of a water tank pedestal of the pet water dispenser according to the present invention.

Referring to FIG. 1 to FIG. 8, a pet water dispenser includes a water replenishment assembly 100 and a base assembly 300. The water replenishment assembly 100 includes a water tank main body 110, a water tank pedestal 120, a water filling tank lid 140 and a water outlet tank lid 130; the water tank main body 110 is equipped with a water outlet port 111 and a water filling port 112, the water filling tank lid 140 is configured to open or close the water filling port 112, and the water outlet tank lid 130 is configured to open or close the water outlet port 111; the water tank pedestal 120 is configured to support the water tank main body 110, so that the water tank main body 110 can stand stably on any plane on a premise of the water outlet port 111 facing downward. The base assembly includes a base main body 310, and the base main body is equipped with a pedestal mounting portion 311; the pedestal mounting portion 311 is configured to fix the water replenishment assembly 100 on the base assembly 300.

By the arrangement of the above structure, during use, since the water filling port 112 is provided, it is not necessary to invert the water tank main body 110 before adding water to the pet water dispenser. Instead, water can be directly added to the pet water dispenser through the water filling port 112. Due to the presence of the water tank pedestal 120, which provides support for the water tank main body 110, the water tank main body 110 can be placed on any flat surface with the water outlet port 111 facing downward. This enables users not only to directly add water to the pet water dispenser through the water filling port 112 but also to conveniently place the water tank main body 110 and the water tank pedestal 120 on any flat surface that is convenient for adding water and then add water to the water replenishment assembly 100 through the water filling port 112, further enhancing the user experience. Since the water filling tank lid 140 is provided, the water filling port 112 can be freely opened or closed as required. When there is no need to add water, the water filling tank lid 140 closes the water filling port 112, which can effectively prevent dust from falling into the drinking water contained in the water tank main body 110, further enhancing the user experience.

In this embodiment, the water outlet tank lid 130 is provided with a water sealing plug 131 and a movable pin 132, and the movable pin 132 is configured to drive the water sealing plug 131 to seal or unblock the water outlet port 111; the water filling tank lid 140 is provided with a gripping handle 141. By the arrangement of the above structure, during use, since the water filling tank lid 140 is provided with a gripping handle 141, users can conveniently transfer the water tank main body 110 and the water tank pedestal 120 to any flat surface convenient for water addition by grasping the gripping handle 141. Because the water outlet tank lid 130 is provided with a water sealing plug 131 and a movable pin 132, and the movable pin 132 can drive the water sealing plug 131 to seal or unblock the water outlet port 111 as required, the water sealing plug 131 can be driven to seal the water outlet port 111 during water addition, and the water sealing plug 131 can be driven to unblock the water outlet port 111 during water feeding.

In this embodiment, the water tank pedestal 120 includes a water tank mounting portion 121, and the water tank mounting portion 121 is provided with a snap-fit hole 1211; the water tank main body 110 further includes a snap-fit mounting portion 113, and the snap-fit mounting portion 113 is provided with a snap-fit projection 1131; the water tank main body 110 and the water tank pedestal 120 are fixedly connected through the water tank mounting portion 121 and the snap-fit mounting portion 113, and the water tank mounting portion 121 and the snap-fit mounting portion 113 are connected by snap-fit through the snap-fit hole 1211 and the snap-fit projection 1131. By the arrangement of the above structure, during use, the snap-fit connection between the snap-fit hole 1211 and the snap-fit projection 1131 enables the water tank mounting portion 121 and the snap-fit mounting portion 113 to be tightly connected together, thereby enabling the water tank main body 110 and the water tank pedestal 120 to be tightly connected together, and thus facilitating the relocation of the water tank main body 110 and the water tank pedestal 120 together.

In this embodiment, the water tank pedestal 120 includes a water tank support portion 122, and the water tank support portion 122 is provided with a plurality of support legs 1221; the pedestal mounting portion 311 is provided with a pedestal mounting hole 3111, and the shape and number of the pedestal mounting holes 3111 match the shape and number of the support legs 1221; the base assembly 300 and the water replenishment assembly 100 are fixedly connected through the pedestal mounting portion 311 and the water tank pedestal 120, and the pedestal mounting portion 311 and the water tank pedestal 120 are detachably connected through the support legs 1221 and the pedestal mounting holes 3111. By the arrangement of the above structure, during use, the support legs 1221 of the water tank support portion 122 can effectively support the water tank main body 110 and the water tank pedestal 120 which are tightly connected together, enabling the tightly connected water tank main body 110 and water tank pedestal 120 to stand stably on any flat surface. The number of the support legs 1221 is preferably four. When the water tank main body 110 and the water tank pedestal 120 are placed on a flat surface by the four support legs 1221, the water outlet tank lid 130 is at a certain distance from the flat surface to ensure that the water outlet tank lid 130 will not be contaminated by stains on it. Because the shape and number of the pedestal mounting holes 3111 match those of the support legs 1221, the water tank main body 110 and the water tank pedestal 120 are stably mounted on the pedestal mounting portion 311 by the four support legs 1221. Since the pedestal mounting portion 311 and the water tank pedestal 120 are detachably connected through the support legs 1221 and the pedestal mounting holes 3111, the water tank main body 110 and the water tank pedestal 120 can be conveniently removed from the pet water dispenser to other locations for water replenishment.

In this embodiment, the water outlet tank lid 130 is provided with a first threaded portion 133; the water filling tank lid 140 is provided with a second threaded portion 142; the water outlet port 111 is provided with a third threaded portion 114; the water filling port 112 is provided with a fourth threaded portion 115; the water outlet tank lid 130 and the water outlet port 111 are threadedly connected through the first threaded portion 133 and the third threaded portion 114, and the water filling tank lid 140 and the water filling port 112 are threadedly connected through the second threaded portion 142 and the fourth threaded portion 115. By the arrangement of the above structure, during use, the first threaded portion 133 and the third threaded portion 114, as well as the second threaded portion 142 and the fourth threaded portion 115, transmit loads through the frictional force between the threads, and no complex connectors are required. Moreover, the threaded connections between the first threaded portion 133 and the third threaded portion 114, and between the second threaded portion 142 and the fourth threaded portion 115 can provide relatively high connection strength, ensuring a firm connection between the water outlet tank lid 130 and the water outlet port 111, and between the water filling tank lid 140 and the water filling port 112. By rotating the threaded components, the tightness of the connection between the water outlet tank lid 130 and the water outlet port 111, and between the water filling tank lid 140 and the water filling port 112 can be easily adjusted. And compared with other connection methods, the installation and disassembly process of the threaded connection is relatively simple, which facilitates maintenance and part replacement, further enhancing the user experience.

In this embodiment, the base assembly 300 further includes a water container 320; the base main body 310 includes an accommodating groove 312; the shape of the accommodating groove 312 matches the external shape of the water container 320, and the accommodating groove 312 is configured to accommodate the water container 320. By the arrangement of the above structure, during use, the water container 320 can be stably placed in the accommodating groove 312 of the base main body 310, so that the drinking water in the water container 320 remains relatively stable.

In this embodiment, the base assembly 300 further includes an anti-slip strip 330; the base main body 310 further includes a mounting groove 313; the shape of the mounting groove 313 matches the external shape of the anti-slip strip 330, and the mounting groove 313 is configured to mount the anti-slip strip 330. By the arrangement of the above structure, during use, the anti-slip strip 330 can be stably mounted on the base main body 310, so that the friction between the base main body 310 and the ground is increased, reducing the risk of the base assembly 300's accidental sliding.

In this embodiment, the water outlet tank lid 130 is further provided with a spring 134, a mounting through hole 135, and a tank-lid abutting portion 136; the movable pin 132 includes an abutting projection 1321, a connecting projection 1322 and a connecting post 1323, and the abutting projection 1321 and the connecting projection 1322 are fixedly connected through the connecting post 1323; the size of the mounting through hole 135 matches the external size of the connecting post 1323; the movable pin 132 is movably mounted on the water outlet tank lid 130 through the connecting post 1323 and the mounting through hole 135; the spring 134 is sleeved on the connecting post 1323, and both ends of the spring 134 abut against the abutting projection 1321 and the tank-lid abutting portion 136 respectively; when the pet water dispenser is in use, the abutting projection 1321 keeps abutting against the water container 320. By the arrangement of the above structure, during use, since the spring 134 is sleeved on the connecting post 1323 and both ends of the spring 134 abut against the abutting projection 1321 and the tank-lid abutting portion 136 respectively, when the movable pin 132 is not under other external forces, that is, when the pet water dispenser is in the non-using state, the water sealing plug 131 seals the water outlet port 111, and water cannot flow out through the water outlet port 111. When the pet water dispenser is in the using state, the abutting projection 1321 keeps abutting against the water container 320, and the movable pin 132 drives the water sealing plug 131 to unblock the water outlet port 111, allowing water to flow out through the water outlet port 111 for pets to drink.

In this embodiment, the water sealing plug 131 is provided with a connecting through hole 1311; the connecting through hole 1311 is arranged at a central position of the water sealing plug 131; the movable pin 132 and the water sealing plug 131 are connected by snap-fit through the connecting through hole 1311 and the connecting projection 1322. By the arrangement of the above structure, during use, since the connecting through hole 1311 is set at the central position of the water sealing plug 131, when the movable pin 132 drives the water sealing plug 131, the water sealing plug 131 will be subjected to more uniform force, thus achieving a better usage effect. Because the movable pin 132 and the water sealing plug 131 are connected by snap-fit through the connecting through hole 1311 and the connecting projection 1322, the relatively simple installation and disassembly processes facilitate maintenance and part replacement, further enhancing the user experience.

In this embodiment, the pet water dispenser further includes a filtering assembly 200, and the filtering assembly 200 is configured to filter water flowing out of the water tank main body 110; the filtering assembly 200 includes a filtering filter element 210, a filtering housing 220, and a filtering cover 230; the filtering housing 220 is provided with an accommodating chamber 221 and an opening 222 connected to the accommodating chamber 221; the filtering cover 230 is fitted over the opening 222 of the accommodating chamber 221, and the filtering filter element 210 is arranged within the accommodating chamber 221. By the arrangement of the above structure, during use, the drinking water can be effectively purified, so that the drinking water meets the hygiene standards, thereby reducing the risk of pets getting sick due to drinking unclean water.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

The invention claimed is:

1. A pet water dispenser comprising:
a water replenishment assembly, wherein the water replenishment assembly comprises a water tank main body, a water filling tank lid, and a water outlet tank lid; the water tank main body is equipped with a water outlet port and a water filling port arranged at opposite ends thereof, the water filling tank lid is configured to open or close the water filling port, and the water outlet tank lid is configured to open or close the water outlet port; the water filling tank lid is provided with a gripping handle;
a water tank pedestal arranged under the water tank main body, and comprising a through hole shaped water tank mounting portion, the water outlet port extending through the water tank mounting portion, wherein the water tank pedestal further comprises a plurality of support legs configured to stand on a plane, so that the water tank main body can stand stably on the plane on a premise of the water outlet port facing downward; and a base assembly, wherein the base assembly comprises a base main body and a water container detachably received in the base main body for pet to drink, the base main body is equipped with a pedestal mounting portion; the pedestal mounting portion comprises a plurality of pedestal mounting holes configured to detachably receive and fix the support legs of the water tank pedestal onto the base assembly, and the water container can abut the water outlet tank lid to allow water flows to the water container.

2. The pet water dispenser according to claim 1, wherein the water tank main body further comprises a snap-fit mounting portion, and the water tank main body and the water tank pedestal are fixedly connected through the water tank mounting portion and the snap-fit mounting portion.

* * * * *